No. 690,744. Patented Jan. 7, 1902.
F. LINE.
AIR CONDUCTING TUBE.
(Application filed June 27, 1899. Renewed Nov. 4, 1901.)
(No Model.)
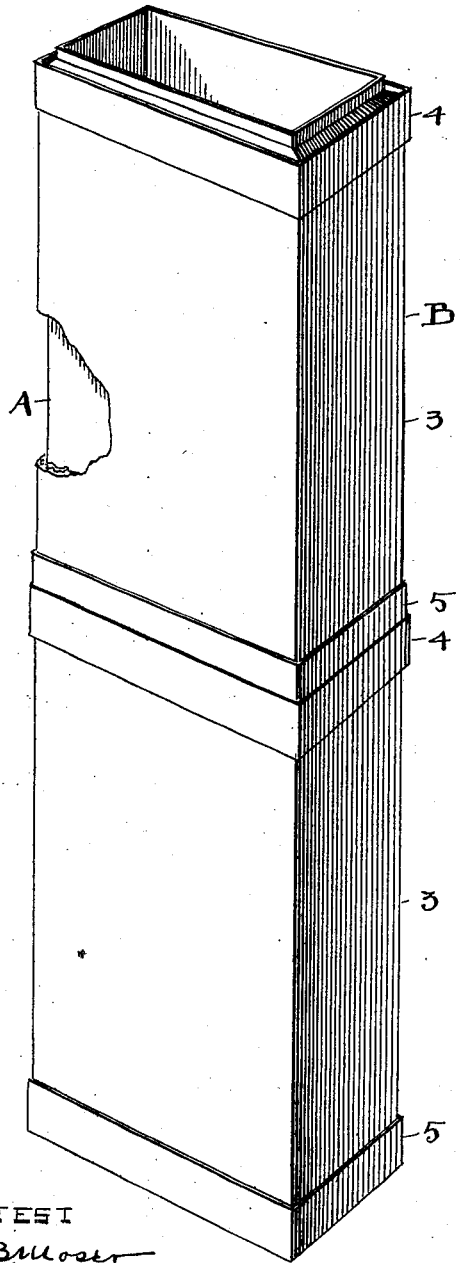
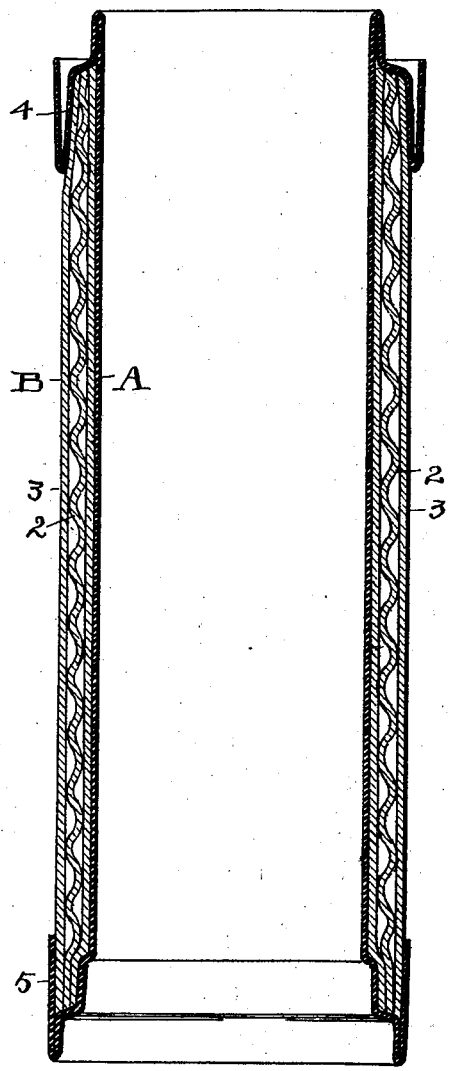
INVENTOR.
FRANCIS LINE
BY H. V. Fisher
ATTY
ATTEST
T. B. Moser
H. E. Mudra.

UNITED STATES PATENT OFFICE.

FRANCIS LINE, OF CLEVELAND, OHIO.

AIR-CONDUCTING TUBE.

SPECIFICATION forming part of Letters Patent No. 690,744, dated January 7, 1902.

Application filed June 27, 1899. Renewed November 4, 1901. Serial No. 81,054. (No model.)

*To all whom it may concern:*

Be it known that I, FRANCIS LINE, a citizen of the United States, residing at Cleveland, in the county of Cuyahoga and State of Ohio, have invented certain new and useful Improvements in Air-Conducting Tubes; and I do declare that the following is a full, clear, and exact description of the invention, which will enable others skilled in the art to which it appertains to make and use the same.

My invention relates to a new article of manufacture in air-conducting tubes; and the invention is an improvement in the line of a contemporaneous application filed by me bearing Serial No. 722,050 and in which the walls of the tube are shown and described as being made wholly out of non-conducting and non-combustible material, such as asbestos fabric. In the said application I fully point out and describe the advantage of a tube thus constructed over those made wholly of tin or like metal and in which for wall-tubes a ventilating construction is employed. In the present application I obtain practically all the advantages referred to in the said application, but have a construction modified so as to provide a metallic inner surface or lining and an asbestos or like body outside, all substantially as shown and described, and particularly pointed out in the claim.

In the accompanying drawings, Figure 1 is a perspective elevation of a couple of united joints or sections of my improved pipe, and Fig. 2 is a longitudinal sectional elevation of one of said sections enlarged.

In the pipe thus shown I employ a single sheet A on the inside of the pipe, preferably of tin, and this sheet is shown also as entering into and forming the joints proper of the pipe, though this is not necessary, and separately-constructed joints or unions for making connection with the next pipe may be used. A sheet-metal lining in a pipe of this kind has the advantage of forming a stiff base on which to build and also of affording a smooth and free surface lining for the air-passage, and thus promoting circulation of the air. It has also the point of cleanliness over a rough surface, on which dust or dirt is liable to settle. This I may overcome in the other application above mentioned by suitably treating the inner lining of the asbestos tube to make the surface thereof hard and smooth. B constitutes what is essentially the material body of this tube and upon which I rely for its service in so far as non-conductivity and safety are concerned. In wall-pipes for hot air the matter of security against overheating through the pipe is much more material than the possible loss by radiation or conducting away of the heat, and yet the present construction is admirably adapted to produce the best results in both these as well as other important particulars.

The body B is in this instance formed of the inner portion 2, of fluted or ribbed asbestos-board, constructed to form air cells or spaces on both sides, and an outer plain sheet 3, of like material, thus, in effect, producing a cellular body having at least all the value in practical service of a solid body and being much lighter and cheaper than such a body would be. Otherwise the body might be solid in one or more thicknesses and as heavy as wanted.

It will be observed that a pipe constructed in this way goes onto the market and is bought and sold as a sheet-lined asbestos pipe made up in lengths and style to suit purchasers and round or square or other shape in cross-section. If square, as here shown, a convenient construction is to cut the asbestos in blocks or slabs to suit and engage their ends within the ample flanges 4 and 5 of the ends. This alone forms all the security needed to confine the asbestos.

What I claim is—

As a new article of manufacture, a pipe-section consisting of a body of sheet-asbestos formed with plain inner and outer walls and an intermediate corrugated sheet bracing and separating said walls their entire length, whereby air-spaces are produced within the said body, and a sheet-metal lining forming the inner surface of the pipe, said lining having its extremities lapped back on the outside of said body to form finished ends for joints, substantially as described.

Witness my hand to the foregoing specification this 14th day of June, 1899.

FRANCIS LINE.

Witnesses:
R. B. MOSER,
H. T. FISHER.